United States Patent Office

3,011,984
Patented Dec. 5, 1961

3,011,984
OXONATION OF BUTYL RUBBER AND COVULCANIZATION PRODUCTS OF SAME WITH NATURAL RUBBER OR BUTADIENE-STYRENE COPOLYMER
Clifford W. Muessig, Colonia, and George E. Serniuk, Roselle, N.J., assignors to Esso Research and Engineering Company, a corporation of Delaware
No Drawing. Filed June 14, 1957, Ser. No. 665,657
3 Claims. (Cl. 260—5)

The present invention relates to the oxonation of low unsaturation rubbery polymers. It also concerns the vulcanization of the oxonated rubbery polymers in the presence or absence of a sulfur-liberating curing agent to form vulcanizates having highly desirable properties.

Attempts have been made to oxonate high unsaturation rubbers, such as natural rubber, with mixtures of carbon monoxide and hydrogen to form saturated polymers having numerous oxygen containing groups. Among the disadvantages encountered was the formation of a gelled product which is impractical and difficult to work with. For this reason, as well as others, oxonated rubbers were given very little consideration.

Heretofore, low unsaturation rubbers and, in particular, butyl rubber, have not been considered to be satisfactory subjects for the oxo process. These low unsaturation synthetic rubbers have a relative chemical inertness and other peculiar properties which make them behave in a unique fashion. For instance, they cure at a much slower rate, are highly air impermeable and resistant to oxygen, ozone and sunlight.

It has now been found that, by employing certain critical conditions, low unsaturation synthetic polymers can be oxonated to produce polymers that are processable and which can be cured at relatively low temperatures in the presence or absence of sulfur-liberating compounds.

According to one embodiment of the present invention, butyl rubber is oxonated in the presence of a cobalt-containing catalyst so that at least a part of its unsaturated bonds react with the carbon monoxide and hydrogen to form a product containing carbonyl and hydroxyl groups. The reaction product is then hydrogenated in the presence of the same catalyst used to oxonate and the catalyst is thereafter removed from the hydrogenated polymer by means of chelating agents. The purified butyl rubber may then be vulcanized with a sulfur-liberating compound and/or a non-sulfur polyfunctional compound that will react with the hydroxyl groups attached to the butyl rubber.

Butyl rubber is a low unsaturation polymer which contains about 85–99.5 wt. percent of a $C_4$–$C_7$ isoolefin, such as isobutylene and about 0.5 to 15 wt. percent of a $C_4$–$C_{14}$ multiolefin such as isoprene, butadiene-1,3-cyclopentadiene, 2-methyl 1,5-hexadiene, etc. The low unsaturation polymers coming within the purview of the invention have a Staudinger molecular weight between about 40,000 and 300,000, and a mole percent unsaturation between about 0.5 and 5.

The butyl rubber, if desired, can be halogenated in a manner which does not noticeably degrade the molecular weight of the polymer. In producing halogenated butyl rubber, unvulcanized butyl rubber is carefully halogenated to contain about at least 0.5 wt. percent of combined halogen but not more than "X" wt. percent combined halogen wherein:

$$X = \frac{M_3 L}{(100-L)M_1 + L(M_2 + M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or two atoms of bromine combined in the polymer per molecule of multiolefin present therein: i.e., not more than about one atom of combined chlorine or two atoms of combined bromine per double bond in the polymer.

Suitable halogenating agents which may be employed are gaseous chlorine, liquid bromine, alkali metal hypochlorites, or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tribromophenol bromide, N-chloroacetamide, beta-bromomethyl phthalimide, N,N'-dimethyl-5,5 dichloro or dibromo hydantoin, and other common halogenating agents.

The halogenation is generally conducted at above 0° to about +100° C., advantageously at about 0° to 65° C., preferably at about 20 to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above mentioned.

The halogenation may be accomplished in various ways. One process comprises preparing a solution of the copolymer, as above, in a suitable inert liquid organic solvent such as a $C_3$ to $C_{10}$ or, preferably a $C_5$ to $C_8$, inert hydrocarbon or halogenated derivatives of saturated hydrocarbons, examples of which are hexane, heptane, naphtha, mineral spirits, benzene, chlorobenzene, chloroform, trichloroethane, carbon tetrachloride, mixtures thereof, etc. and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered according to various techniques. For instance, the polymer may be precipitated with acetone or any other known non-solvent for the butyl rubber and dried under about 1 to 760 millimeter or higher of mercury pressure absolute at about 0° to 180° C., preferably at about 70° C. Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a mole percent unsaturation of between about 0.5 and 5.0.

The total volume of carbon monoxide and hydrogen used to oxonate the synthetic rubber may vary between about 500 and 15,000 cubic feet per 100 lbs. of rubber. The volume ratio of carbon monoxide to hydrogen should be between about 0.5:1 to 0.5:10 and preferably between 2:1 and 1:2. The oxonation may be carried out at pressures ranging between 1000 and 10,000 p.s.i.g. However, for most purposes a pressure of 2,000 to 3,000 p.s.i.g. has been found to be satisfactory. The reaction temperature may be as low as 20° C. or as high as 200° C., depending upon the reaction time and other conditions. At the lower temperatures it may require as long as two days to oxonate the rubber while at the higher temperatures the reaction may take place within one hour or less. Preferably the butyl rubber is oxonated at a temperature between 150 and 185° C. for from 1 hour to 24 hours.

The catalyst is preferably a cobalt-containing compound, such as cobalt naphthanate, cobalt oleate, cobalt carbonate, cobalt carbonyl, etc. However, other metal compounds, such as iron, copper, nickel, may be used if desired. The active catalyst concentration may range from about 0.1 to 5 wt. percent based on the rubber. A concentration of about 0.5 to 1 wt. percent has been found to be highly effective.

Prior to oxonating the rubber, it is essential to remove contaminants which may interfere with the reaction or poison the catalysts. It is known that certain metal compounds, such as zinc and calcium stearates, which are commonly used as slurry aids in the preparation of butyl rubber, will interfere with the oxonation. These substances, as well as low molecular weight diolefins, should be removed from the butyl rubber before subjecting it to the oxonation step. The removal of the slurry aids may be accomplished by using a finely divided mineral such as clay or conventional filter aids. Usually between about 20 and 30 parts by weight of the filter aid is mixed with 100 parts of rubber in the form of a 10 to 20 wt. percent solution of the butyl rubber or halogenated butyl rubber dissolved in an inert diluent and the resulting mixture is heated to between about 40 and 50° C. for, say, about ½ to 1 hour. The filter aid may be readily removed by filtration of centrifugation and the filtrate or clear, supernatant liquid may be oxonated without running into any serious difficulties.

By treating the synthetic rubber in this manner it is immediately ready for the oxonation step since the modification is generally carried out with the rubber in a dissolved form. Among the diluents which are suitable are hydrocarbons, such as hexane, benzene, cyclohexane, cyclopentane, and halogen-containing compounds such as chloroform and carbon tetrachloride.

To improve the stability of the modified butyl rubber and prevent it from gelling or cross-linking, it should be hydrogenated immediately after the oxonation step. This may be accomplished by degassing, flushing out the reactor with hydrogen and charging in about 1,000 to 3,000 p.s.i.g. of hydrogen, heating the reactor up to a temperature of 150–200° C. and maintaining that temperature for between about 1–24 hours. An important advantage of the invention is that the hydrogenation may take place in the presence of the same catalyst used to oxonate the synthetic rubber. This permits the immediate hydrogenation of the reaction product and practically eliminates gelling.

Following the hydrogenation, the modified butyl rubber is purified by mixing the rubber solution with a suitable chelating agent, such as an organic amine, e.g., ethylene diamine, a nitroso compound, e.g., dinitrosoresorcinol, etc. The amount of chelating agent employed will vary according to the effectiveness of the particular compound. For most purposes between about 5 and 15 parts by weight of chelating agent are mixed with 100 parts by weight of the modified rubber which is still in solution. The resulting mixture is generally agitated for from 10 to 30 mins. at about 20 to 30° C. and the precipitate formed is separated from the modified butyl rubber solution by any conventional method, such as filtration. The absence of a pink color from the butyl rubber solution is indicative of the removal of cobalt.

The oxonated butyl rubber may contain as little as 0.05 wt. percent oxygen or as much as 2 to 3 wt. percent. However, for most purposes, it should contain between 0.1 and 1 wt. percent oxygen. Qualitative evaluations of the oxonated product show it contains a substantial number of hydroxyl groups.

After decobalting, the modified butyl rubber solution may be utilized in a number of ways. For instance, the solution itself may be employed in any conventional manner as a cement, or the solvent may be stripped off at elevated temperatures and subatmospheric pressures to recover the modified butyl rubber in a solid form.

In the case of latices, the modified butyl rubber cement may be emulsified with an aqueous solution and stripped of the solvent. Alternately, the oxonation step may be carried out with the butyl rubber in latex form. For example, the oxonation reaction may be effected at a temperature between 150 and 200° C. under 2,000 to 3,000 p.s.i.g. in the presence of a cobalt catalyst and an atmosphere of carbon monoxide and hydrogen. After a sufficient time, say 1 to 24 hours, an oxonated butyl rubber latex is recovered. The product may be hydrogenated according to conventional methods and decobalted with ethylene diamine.

The oxonated butyl rubber may be compounded with various carbon blacks, such as the thermal, channel, and furnace blacks, silicious substances, such as clay, silicon oxides, and other pigments, such as titanium dioxide and zinc oxide, and heated to between about 130 and 200° C. in the presence or absence of about 0.1 to 2 parts by weight of a promoter per 100 parts by weight of butyl rubber. Among the promoters which have been successfully used in this manner are nitroso aromatic compounds, such as meta and para-dinitroso benzene, as well as various quinone dioximes, such as para-quinone dioxime. For example, 100 parts by weight of the oxonated butyl rubber may be compounded with between 30 to 60 parts by weight of a carbon black and heated to a temperature of about 140 to 160° C. for from 5 to 20 mins. in a Banbury mixer or on a hot mill. The heat treatment results in a bonding between the modified rubber and the filler.

One of the important properties of the oxonated butyl rubber is that it may be vulcanized in the presence or absence of a sulfur-liberating curing agent such as sulfur, tellurium diethyl dithiocarbamate, selenium diethyl dithiocarbamate, benzothiazyl disulfide, tetramethylthiuram disulfide, etc. The vulcanization may be carried out at temperatures as low as 0° C. and as high as 200° C. by employing polyfunctional compounds that will react with the hydroxyl groups attached to the modified butyl or halogenated butyl rubber. Among the polyfunctional compounds which will vulcanize the oxonated butyl rubber are organic compounds, such as polyamines, e.g., trimethylene diamine; polyamides, polyisocyanates, such as diphenylmethane 4,4′-diisocyanate polybasic acids, such as phthalic acid; and inorganic compounds, such as boron hydrides and boric acid anhydride. In most instances, between about 0.5 and 10 parts by weight of the polyfunctional vulcanizing compound is compounded with 100 parts by weight of the modified butyl rubber and the compounded rubber is allowed to cure over a period of from several hours to several days at room temperature or from a few seconds up to several hours at 200 to 50° C. One also has the option of curing oxonated butyl rubber either in solution, e.g., dissolved in hexane, in a latex or in a solid form. The ability to cure at low temperatures in either a liquid or solid form permits many versatile uses of the modified butyl rubber. For instance, it is highly adaptable to coating fabrics where it is generally undesirable to use vulcanization temperatures of higher than about 50° C. or it can be used as an adhesive or lamina.

Because of the numerous active groups located on the oxonated butyl rubber, it can readily be covulcanized with high unsaturation rubber such as GR-S rubber (styrene-butadiene) and natural rubber. This is a distinct advantage over conventional butyl rubber which can only be covulcanized with the high unsaturation rubbers with difficulty. Alternately, butyl rubber and a high unsaturation polymer, say, natural rubber, may be dissolved in a common solvent and oxonated together in the manner already described.

In addition to the vulcanizing agents, other conventional ingredients may be compounded into the rubber recipe according to the vulcanizate requirements. To be specific, the modified butyl rubber may be compounded with anti-oxidants, paraffinic or naphthenic oils, pigments, fillers, light absorbing substances, and resins. All of the foregoing may be added in conventional amounts.

While the following examples serve to illustrate the invention, they are not to be construed as limitations thereof.

*Example 1*

An isoprene-isobutylene butyl rubber (GR-I-25) having a mole percent unsaturation of 2.1 was oxonated according to the following procedure. 100 grams of the butyl rubber was dissolved in 1000 ml. of benzene at 20-30° C. and the resulting solution was mixed with 30 grams of a 1-10 micron diatomaceous earth, filtered, and the polymer filtrate, which consisted of 1210 ml., was charged into a bomb together with 0.48 gram of cobalt oleate in 30 ml. of hexane. The bomb was flushed with a 1/1 volume mixture of carbon monoxide to hydrogen and then pressured with the same ratio of carbon monoxide:hydrogen to 500 p.s.i.g. The bomb was allowed to stand for 2 days at 20-30° C. before it was placed in a rocker heater and degassed. The bomb was repressured with the same mixture of carbon monoxide and hydrogen to a pressure of 2,000 p.s.i.g., sealed, rocked and heated to a temperature of 135° C. for one hour from which temperature it was allowed to decrease gradually to 100° C. The bomb was held at the latter temperature for 6 hours and then allowed to cool overnight with shaking.

The solution in the bomb was a clear purplish color. The product was isolated by precipitation using benzene as a solvent and acetone as an antisolvent. The residual solvents were stripped from the product by heating for 16 hours at 60° C. under 240 mm. mercury pressure. There was a slight pink color due to the cobalt present in the polymer. An analysis of the product showed that the butyl rubber contained 0.40 wt. percent of oxygen.

*Example 2*

100 grams of the same butyl rubber was used in Example 1 were dissolved in 1000 ml. of benzene, treated with the same diatomaceous filter aid, and charged into a bomb together with 0.48 gm. of cobalt carbonyl dissolved in 30 ml. of hexane. The bomb was pressurized with a 1/1 carbon monoxide to hydrogen mixture to an initial pressure of 2000 p.s.i.g. and rocked while it was heated at 185° C. for 8 hours. The bomb was cooled with shaking and the polymer solution recovered was mixed with 5 gms. of ethylene diamine, stirred for 20 minutes and filtered through the filter aid used above. The modified butyl rubber, isolated from the residual solvents by the same technique described in Example 1, was found to contain 0.8 wt. percent of oxygen. There was no evidence of any color which could be attributed to residual catalyst in the polymer.

A 25 ml. sample of the filtrate, prior to stripping the residual solvents, was treated with 5 drops of hexamethylene diisocyanate. The solution was allowed to stand overnight at room temperature and on the following morning the modified butyl rubber was completely gelled. This demonstrates that the reaction product was modified and that the functional groups introduced were hydroxyl.

*Example 3*

An experiment was carried out to demonstrate that oxonated butyl rubber may be cured with a polyfunctional compound other than sulfur and that the cured butyl has desirable properties. 100 gms. of isoprene-isobutylene butyl rubber (GR-I-25) which was prepared according to the method described in Example 2 and which contained 0.67 wt. percent oxygen, was compounded with 50 gms. of MPC carbon black and 2 gms. of diphenylmethane 4,4'-diisocyanate on a laboratory mill and then cured at 150° C. for one hour. An evaluation of the physical properties of the cured butyl rubber showed that it had a tensile strength of 1050 p.s.i. and an elongation of 200%.

*Example 4*

Another run was made to illustrate the advantages of oxonating and hydrogenating halogenated butyl rubber. 100 gms. of chlorinated isoprene-isobutylene rubber (GR-I-18), which contained 1.3 wt. percent chlorine, was dissolved in 1000 ml. of benzene at 30° C. and the resulting solution was agitated with 30 gms. of diatomaceous earth. The mixture was filtered and the clay-free filtrate was charged into a 3-liter bomb together with 0.48 gm. of cobalt carbonyl in 30 ml. of hexane. After flushing the bomb with carbon monoxide and hydrogen, it was pressured with 2000 p.s.i.g. of gas consisting of carbon monoxide and hydrogen in a 1:1 mixture. The reactants were heated at 100° C. with shaking for 8 hours and at the end of this time the bomb was cooled and the polymer solution recovered was treated with 5 mls. of ethylene diamine which served to remove the cobalt catalyst. The decobalted product was treated with diatomaceous earth with stirring for 20 mins. and then filtered. The polymer was isolated by the same procedure set forth in Example 1. Analyses of the oxonated butyl rubber showed that it contained 0.43 wt. percent oxygen and 0.31 wt. percent chlorine.

The oxonated, chlorinated butyl rubber is then hydrogenated in the presence of a cobalt oleate catalyst under 2000 p.s.i.g. of hydrogen at a temperature of 135° C. 100 gms. of the product recovered is cured at 100° C. with 2 gms. of phthalic acid and 5 gms. of zinc oxide.

Resort may be had to various modifications and variations of the present invention without departing from the spirit of the discovery or the scope of the appended claims.

What is claimed is:

1. A composition of matter which comprises a rubbery copolymer of butyl rubber comprising a major amount of isoolefin with a minor amount of multiolefin; said composition having been oxonated in the presence of carbon monoxide and a catalyst selected from the group consisting of a naphthenate, oleate, carbonate, and carbonyl of a metal selected from the group consisting of cobalt, iron, copper, and nickel; said composition having been hydrogenated in the presence of said same catalyst; said composition being capable of being co-cured at a temperature between 0 and 200° C. with a high unsaturation rubber selected from the group consisting of natural rubber and the copolymer of butadiene with styrene to provide a co-vulcanizate therefrom.

2. The composition according to claim 1 which has been co-cured in the presence of diphenylmethane 4,4'-diisocyanate to provide a covulcanizate therefrom.

3. A composition of matter which comprises a rubbery copolymer of butyl rubber comprising a major amount of isoolefin with a minor amount of multiolefin which has at least 0.5 wt. percent halogen therein which is selected from the group consisting of chlorine and bromine; said composition having been oxonated in the presence of carbon monoxide and a catalyst selected from the group consisting of a naphthenate, oleate, carbonate, and carbonyl of a metal selected from the group consisting of cobalt, iron, copper, and nickel; said composition having been subsequently hydrogenated in the presence of said same catalyst; said composition being capable of being vulcanized at a temperature between 0 and 200° C.

References Cited in the file of this patent

UNITED STATES PATENTS

| | | |
|---|---|---|
| 2,439,514 | Herndon | Apr. 13, 1948 |
| 2,448,368 | Gresham et al. | Aug. 31, 1948 |
| 2,544,555 | Jones et al. | Mar. 6, 1951 |
| 2,658,932 | Cohen et al. | Nov. 10, 1953 |
| 2,752,978 | Kindle et al. | July 3, 1956 |
| 2,811,502 | Gessler et al. | Oct. 29, 1957 |

FOREIGN PATENTS

| | | |
|---|---|---|
| 773,897 | Great Britain | May 1, 1957 |
| 852,882 | Germany | Oct. 20, 1952 |